United States Patent
Hsieh et al.

(10) Patent No.: US 10,851,209 B2
(45) Date of Patent: Dec. 1, 2020

(54) AMPHIPHILIC MACROMOLECULES, CONTACT LENS THEREOF AND PREPARING METHODS THEREOF

(71) Applicant: NATIONAL CHIAO TUNG UNIVERSITY, Hsinchu (TW)

(72) Inventors: Yun-Ru Hsieh, Taichung (TW); Dean-Mo Liu, Zhubei (TW); Yu-Cheng Chien, Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 157 days.

(21) Appl. No.: 16/255,680

(22) Filed: Jan. 23, 2019

(65) Prior Publication Data

US 2020/0010622 A1    Jan. 9, 2020

(30) Foreign Application Priority Data

Jul. 6, 2018    (TW) .............................. 107123475 A

(51) Int. Cl.
*C08G 77/44* (2006.01)
*C08G 77/442* (2006.01)
*G02B 1/04* (2006.01)
*C08J 3/24* (2006.01)
*C08G 77/00* (2006.01)

(52) U.S. Cl.
CPC .............. *C08G 77/442* (2013.01); *C08J 3/24* (2013.01); *G02B 1/043* (2013.01); *C08G 77/70* (2013.01)

(58) Field of Classification Search
CPC ....... C08L 51/085; C08L 51/08; C08G 77/38; C08G 77/388; G02B 1/043; G02B 1/04
See application file for complete search history.

(56) References Cited

U.S. PATENT DOCUMENTS

2014/0088259 A1* 3/2014 Liu ....................... C08F 220/18
                                                          525/329.5
2018/0037690 A1* 2/2018 Aitken ................ C08F 283/124

OTHER PUBLICATIONS

Vargun et al. Synthesis and surface properties of polydimethylsiloxane-based block copolymers: poly[dimethylsiloxane-block-(ethyl methacrylate)] and poly[dimethylsiloxane-block-(hydroxyethyl methacrylate). Polymer International, 59 (12), 1586-1597 (Year: 2010 ).*

Bas et al. Synthesis, characterization and properties of amphiphilic block copolymers of 2-hydroxyethylmethacrylate and polydimethylsiloxane prepared by atom transfer radical polymerization. Polymer Journal ,44, 1087-1097. (Year: 2012).*

(Continued)

Primary Examiner — Sanza L. McClendon
(74) Attorney, Agent, or Firm — Muncy, Geissler, Olds & Lowe, P.C.

(57) ABSTRACT

A manufacturing method of amphiphilic macromolecules is provided. The method includes: reacting the first acrylic acid with N,N'-carbonyldiimidazole to obtain a modified acrylic acid derivative; and reacting the modified acrylic acid derivative with the siloxane derivative to obtain amphiphilic macromolecules. Wherein, the terminal of the first acrylic acid has a hydroxyl group. Wherein, the siloxane derivative is a hydroxyl-terminated, acrylamide-terminated, epoxy-terminated or amine-terminated polysiloxane molecule.

9 Claims, 9 Drawing Sheets
(1 of 9 Drawing Sheet(s) Filed in Color)

(56) References Cited

OTHER PUBLICATIONS

W. N. E. van Dijk-Wolthuisa et al. A new class of polymerizable dextrans with hydrolyzable groups: hydroxyethyl methacrylated dextran with and without oligolactate spacer. Polymer, vol. 38, Issue 25, 1997, pp. 6235-6242 (Year: 1997).*

Yuanxue Hou et al. Synthesis and Surface Analysis of Siloxane-Containing AmphiphilicGraft Copolymers, Poly(2-hydroxyethyl methacrylate-g-dimethylsiloxane) and Poly(2,3-dihydroxypropyl methacrylate-g-dimethylsiloxane). Macromolecules 2002, 35, 5953-5962 (Year: 2002).*

E.S. Sinitsyna et al. Hydrophilic methacrylate monoliths as platforms for protein microarray. Polymer, vol. 52, Issue 10, May 4, 2011, pp. 2132-2140 (Year: 2011).*

\* cited by examiner

AMPHIPHILIC MACROMOLECULES, CONTACT LENS THEREOF AND PREPARING METHODS THEREOF

CROSS-REFFERENCE TO RELATED APPLICATION

This application claims priority from Taiwan Patent Application No. 107123475, filed on Jul. 6, 2018 in Taiwan Intellectual Property Office, the disclosures of which are hereby incorporated by reference in their entirety for all purposes.

BACKGROUND OF THE INVENTION

1. Field of the Invention

The present invention provides amphiphilic macromolecules, a contact lens thereof and manufacturing methods thereof, more particularly to amphiphilic macromolecules, a contact lens thereof and manufacturing methods thereof that are capable of increasing oxygen permeability.

2. Description of the Related Art

To avoid limitations of traditional glasses, such as carrying inconveniently, easily being bent when impacted, and being in a condition when wearing glasses are not allowed, a contact lens becomes a much simpler alternative. However, wearing the contact lens for hours may cause eyes to become dry, hyperemia, or oxygen deficiency.

The technique of increasing the oxygen permeability of the contact lens nowadays is realized mainly by adding the amount of siloxane molecules. Young's modulus also increases, making the contact lens have a more rigid property, thus increasing the sustainability of the shape of the contact lens. However, the main element of the contact lens is a hydrophilic monomer while the property of the siloxane molecules is hydrophobic. Therefore, the hydrophilic monomer in the contact lens is immiscible with the siloxane molecules, resulting in a phase change in the contact lens. This leads to a low transparency and quality of the contact lens.

In prior art, the focus is placed on using an organic synthetic method to directly modify siloxane molecules. Due to siloxane molecule's stable structure, complex procedures are needed to prepare the modified siloxane molecules, and the groups that can perform modifications are also limited. Hence, there is a need to address the issue of the poor miscibility between hydrophilic monomers and hydrophobic siloxane molecules.

SUMMARY OF THE INVENTION

In view of the problem as mentioned above, the present invention provides amphiphilic macromolecules, a contact lens and manufacturing methods thereof. By using N,N'-carbonyldiimidazole, the hydrophilic monomer is bonded with the polysiloxane molecule to form amphiphilic macromolecules in such a way that the amphiphilic macromolecules of the group including hydrophilic monomer is miscible with the contact lens. This may overcome the problem of the poor miscibility in prior art, thus solving the problem as stated above.

According to the purpose, the present invention provides a manufacturing method for amphiphilic macromolecules, which includes: reacting a first acrylic acid derivative with N,N'-carbonyldiimidazole to obtain a modified acrylic acid derivative; and reacting the modified acrylic acid derivative with a siloxane derivative to obtain amphiphilic macromolecules; wherein the terminal of the first acrylic acid derivative has a hydroxyl group; wherein the siloxane derivative is a hydroxyl-terminated, acrylamide-terminated, epoxy-terminated, or amine-terminated polysiloxane molecule.

Preferably, the first acrylic acid derivative is hydroxyethyl methacrylate or hydroxymethyl methacrylate.

Preferably, polysiloxane molecule is polydimethoxysiloxane.

Preferably, the structure of the siloxane derivative is as shown in Structural Formula 1:

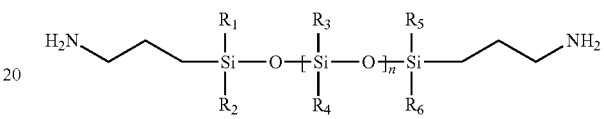

Structural formula 1

Wherein, $R_1$ to $R_6$ are each independently selected from H, substituted or unsubstituted $C_1$-$C_{30}$ alkyl group, substituted or unsubstituted $C_1$-$C_{30}$ heteroalkyl group, substituted or unsubstituted $C_3$-$C_{30}$ cycloalkyl group, substituted or unsubstituted $C_2$-$C_{30}$ heterocycloalkyl group, substituted or unsubstituted $C_2$-$C_{30}$ alkenyl group, substituted or unsubstituted of $C_3$-$C_{30}$ cycloalkenyl group, substituted or unsubstituted $C_2$-$C_{30}$ heterocycloalkenyl group, substituted or unsubstituted $C_6$-$C_{60}$ aryl group, and substituted or unsubstituted $C_1$-$C_{60}$ heteroaryl group; and n is an integer ranging from 500-2500.

According to the purpose, the present invention provides another amphiphilic molecule, prepared by the manufacturing method as stated above.

According to the purpose, the present invention provides another manufacturing method of the contact lens, which includes: mixing the aforementioned amphiphilic macromolecules with a second acrylic acid derivative, wherein the first acrylic acid derivative and the second acrylic acid derivative are identical or different; and adding photocrosslinking agents and giving illumination to react the amphiphilic macromolecules with the second acrylic acid derivative for photocrosslinking, thus obtaining a contact lens.

According to the purpose, the present invention provides another contact lens, obtained by the manufacturing method as stated above.

Preferably, the amphiphilic macromolecules account for 0.5 wt %-10 wt % of the weight of the contact lens.

Preferably, Young's modulus of the contact lens is in a value from 0.2 to 1 MPa.

The amphiphilic macromolecules, the contact lens, and manufacturing methods thereof of the present invention have the advantages as stated below:

(1) The amphiphilic macromolecules of the present invention have good miscibility with the hydrophilic monomers in the contact lens, thus achieving the purpose of reducing phase separation. Because the amphiphilic macromolecules include the siloaxane, the oxygen permeability and Young's modulus of the contact lens may increase. Therefore, the contact lens containing the amphiphilic macromolecules of the present invention has excellent oxygen permeability while maintaining high transmittance. This confirms that the problem of immiscibility has been solved, and the properties, such as Young's modulus, tensile rates, and water retention still maintained at a high quality level.

(2) The amphiphilic macromolecules of the present invention may not only be applied to making a contact lens, but also be applied to the fields such as optical lenses, biomedical implants, and biomedical patches owing to the fine miscibility with hydrophilic materials. The amphiphilic macromolecules therefore have a wide range of application.

(3) The properties of amphiphilic macromolecules of the present invention may be changed by changing the composition of acrylic acid derivative and/or siloxane derivative. In the meantime, the properties of the contact lens of the present invention may be changed by altering the weight percentage of the amphiphilic macromolecules and the acrylic acid derivative, or by altering the photocrosslinking proportion. Therefore, the amphiphilic macromolecules and the contact lens of the present invention may be adjusted according to requirements.

(4) The amphiphilic macromolecules of the present invention are easy to produce, can be produced in bulk, has extremely high productivity of the purification process. In the meantime, by using the amphiphilic macromolecules of the manufacturing method to manufacture contact, the transmittance of the contact lens may maintain above 92%.

(5) In the condition that the siloxane derivative of the present invention is a amine-terminated polysiloxane molecule, if 4-toluenesulfonyl chloride, commonly used in organic synthesis, is substituted by N,N'-carbonyldiimidazole of the present invention, the modified acrylic acid derivative cannot react with siloxane derivative because of insufficient amino alkaline of the terminal of siloxane derivative. Furthermore, compared to 4-toluenesulfonyl chloride, N,N'-carbonyldiimidazole used in the present invention may allow reaction to occur without additional catalyst or adjustment to environmental pH value.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

To make the purpose, technical features, and actual implementation benefits more readily understood by those skilled in the art, the embodiments shall be described in more detail below with reference to the drawings.

Figure 1:
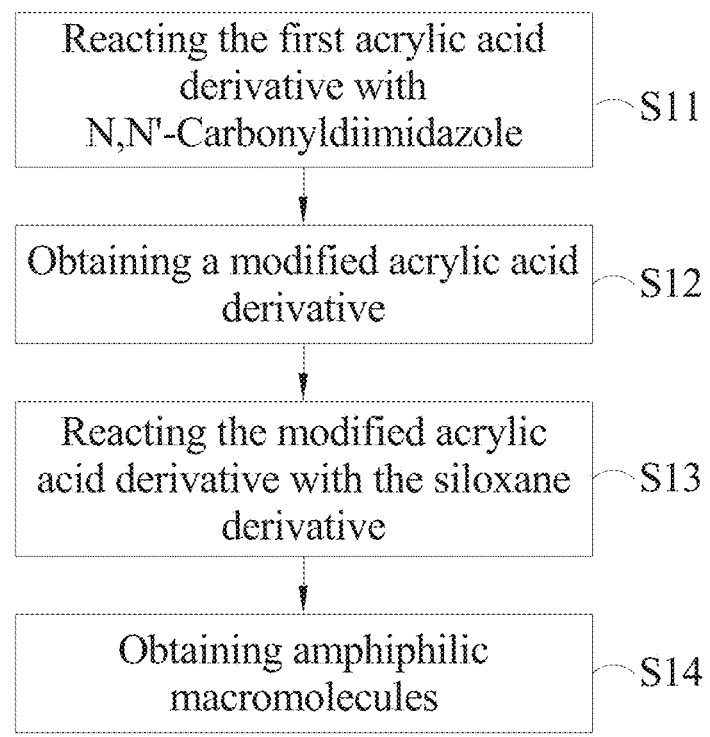
FIG. 1 is a flowchart of the manufacturing method of the amphiphilic macromolecules of the present invention.

Please refer to FIG. 1 which shows the flow chart of the manufacturing method of the amphiphilic macromolecules of the present invention.

Step S11: reacting N,N'-carbonyldiimidazole (CDI) with acrylic acid derivative. In an embodiment, at least one terminal of acrylic acid derivative may have a hydroxyl group. In an embodiment, acrylic acid derivatives may be hydroxyethyl methacrylate or hydroxymethyl methacrylate.

Step S12: obtaining a modified acrylic acid derivative. In an embodiment, the manufacturing processes known to those skilled in the art, namely water removal, filtration, concentration under reduced pressure, gravity filtration, extraction, back extraction, drying, may be used to purify the modified acrylic acid derivative.

Step S13: reacting the modified acrylic acid derivative with siloxane derivative. In an embodiment, siloxane derivatives may be hydroxyl-terminated, acrylamide-terminated, epoxy-terminated, or amine-terminated polysiloxane molecules. In an embodiment, siloxane derivatives may be amine-terminated polysiloxane molecules which are used to achieve the bonding effect. In an embodiment, polysiloxane molecules may be polydimethoxysiloxane (PDMS). That is, siloxane derivatives may be hydroxyl-terminated, acrylamide-terminated, epoxy-terminated, or amine-terminated polydimethoxysiloxane.

In an embodiment, the structure of siloxane derivatives is as shown in structural formula 1:

Structural formula 1

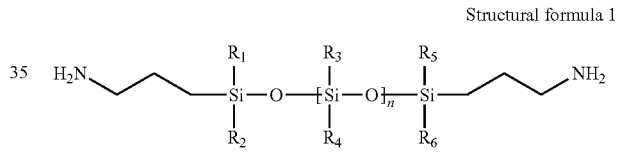

Wherein, R1 to R6 are each independently selected from H, substituted or unsubstituted $C_1$-$C_{30}$ alkyl group, substituted or unsubstituted $C_1$-$C_{30}$ heteroalkyl group, substituted or unsubstituted $C_3$-$C_{30}$ cycloalkyl group, substituted or unsubstituted $C_2$-$C_{30}$ heterocycloalkyl group, substituted or unsubstituted $C_2$-$C_{30}$ alkenyl group, substituted or unsubstituted of $C_3$-$C_{30}$ cycloalkenyl group, substituted or unsubstituted $C_2$-$C_{30}$ heterocycloalkenyl group, substituted or unsubstituted $C_6$-$C_{60}$ aryl group and substituted or unsubstituted $C_1$-$C_{60}$ heteroaryl group; and n is an integer ranging from 500-2500. In an embodiment, n may be an integer ranging from 750-1500.

Step S14: obtaining amphiphilic macromolecules. In an embodiment, the manufacturing processes known to those skilled in the art, namely water removal, filtration, concentration under reduced pressure, gravity filtration, extraction, back extraction, drying, may be used to purify the amphiphilic macromolecules.

Figure 2:
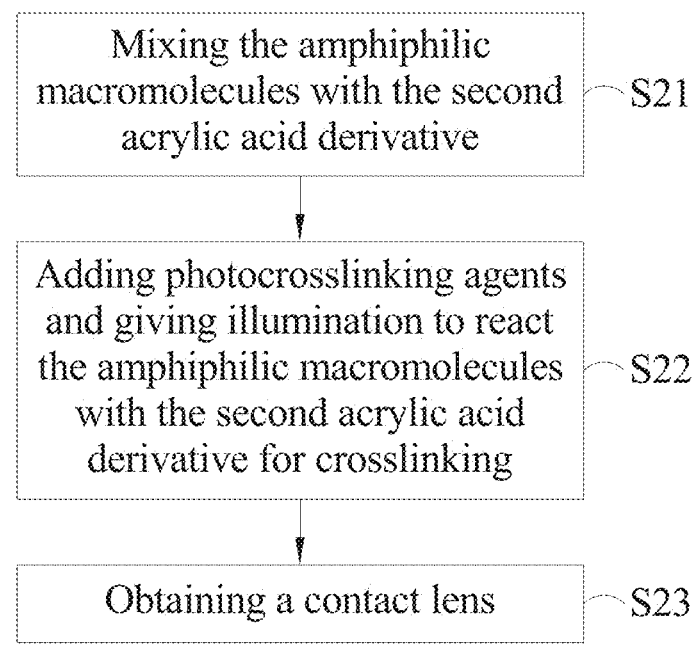
FIG. 2 is a flowchart of the manufacturing method of the contact lens of the present invention.

Please refer to FIG. 2 which shows the flow chart of the manufacturing method of the contact lens of the present invention.

Step S21: mixing the amphiphilic macromolecules with the second acrylic acid derivative. In an embodiment, the amphiphilic macromolecules account for 0.5 wt %-10 wt % of the weight of the contact lens. If the weight percentage of the amphiphilic macromolecules is too low, Young's modulus will be insufficient. In contrast, if the weight percentage of the amphiphilic macromolecules is too high, the Young's modulus will be too high, thus causing damage to ones' cornea. In an embodiment, the first acrylic acid and second acrylic acid derivative may be identical or different. In an embodiment, the first acrylic acid derivative and second acrylic acid derivative may both be hydroxyethyl methacrylate. In an embodiment, alkaline solution may be added to adjust the pH value. In an embodiment, the mixing process may be the mixing process known to those skilled in the art.

Step S22: adding photocrosslinking agents and giving illumination to react the amphiphilic macromolecules with the second acrylic acid derivative for crosslinking. In an embodiment, the photocrosslinking agents may be Darcour1173, Azobisisobutyronitrile (AIBN), or Benzoyl peroxide (BPO). The crosslinking may be performed under a proper wavelength. In an embodiment, the crosslinking ratio may be 50%-90%. If the crosslinking ratio is too low, the contact lens may have a loose structure and break easily. In contrast, if the crosslinking ratio is too high, the oxygen permeability would be insufficient, therefore reducing the capability of water absorption.

Step S23: obtaining a contact lens. In an embodiment, the Young's modulus of the contact lens is in a value from 0.2 to 1 MPa. In an embodiment, the transmittance of the contact lens is 92%. In an embodiment, the amphiphilic macromolecules are evenly dispersed in the contact lens.

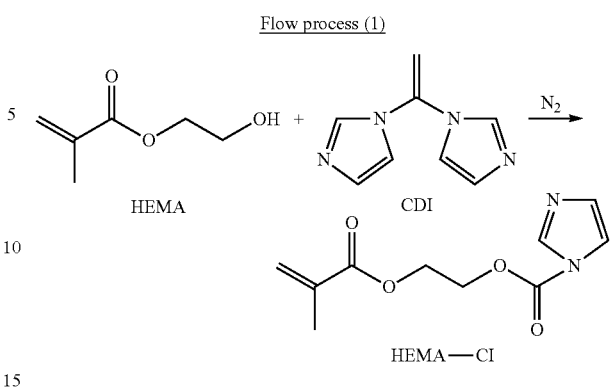

Flow process (1)

Next, PDMS-NH$_2$ is dissolved in dichloromethane and stirred evenly. HEMA-CI is dissolved in dichloromethane. The solutions as stated above are mixed and then concentrated after the reaction is completely done. The solutions are dissolved in potassium dihydrogen phosphate (KH$_2$PO$_4$). The organic layer is extracted with dichloromethane. After dehydrating with anhydrous magnesium sulfate, filtration and concentration are performed. Afterwards, the solutions are drained to obtain a crude product. Finally, silica gel column chromatographic analysis is carried out using ethyl acetate: n-hexane to obtain amphiphilic macromolecules called HEMA-PDMS-HEMA. The reaction process is as shown in process (2).

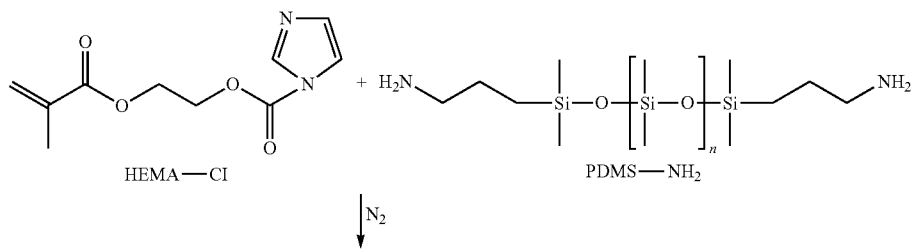

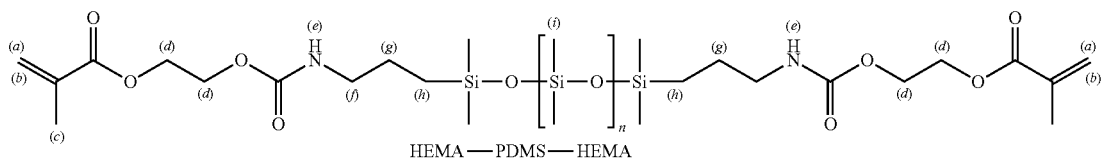

50

In an embodiment, 2-hydroxyethyl methacrylate (HEMA) may be used as an acrylic acid derivative, and Poly(dimethylsiloxane)(bis(3-aminopropyl) terminated, PDMS-NH$_2$) may be used as a siloxane derivative. Moreover, N,N'-carbonyldiimidazole (CDI) may be used for reaction to prepare amphiphilic macromolecules. The procedure in detail is stated below.

Firstly, the reaction is performed under nitrogen gas. CDI is dissolved in dichloromethane and stirred evenly. HEMA is dissolved in dichloromethane and stirred evenly. The solutions as stated above are mixed for reaction. The organic layer is extracted with dichloromethane. Lastly, dehydration and filtration are performed with anhydrous magnesium sulfate. A product in brown color called HEMA-CI is obtained by concentration under a reduced pressure. The reaction process is as shown in process (1).

Subsequently, various property analyses are performed on the produced amphiphilic macromolecules.

Figure 3:
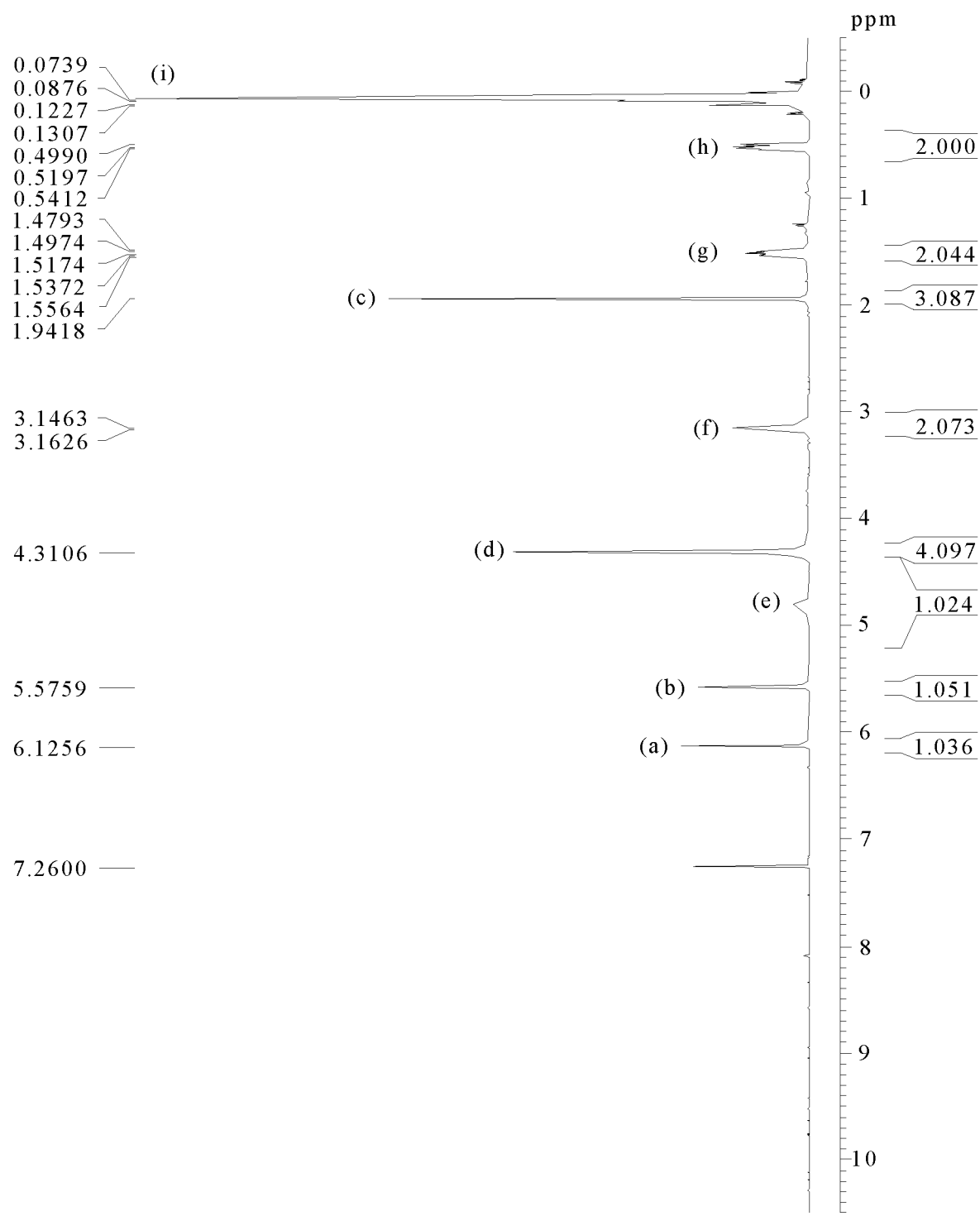
FIG. 3 is a NMR analytical graph of the amphiphilic macromolecules of the present invention.

Please refer to FIG. 3 which shows the NMR analytical graph of the amphiphilic macromolecules of the present invention. With process (2), it is known that every characteristic peak of amphiphilic macromolecules is shown in FIG. 3. This shows that the amphiphilic macromolecules have been successfully prepared.

Figure 4:
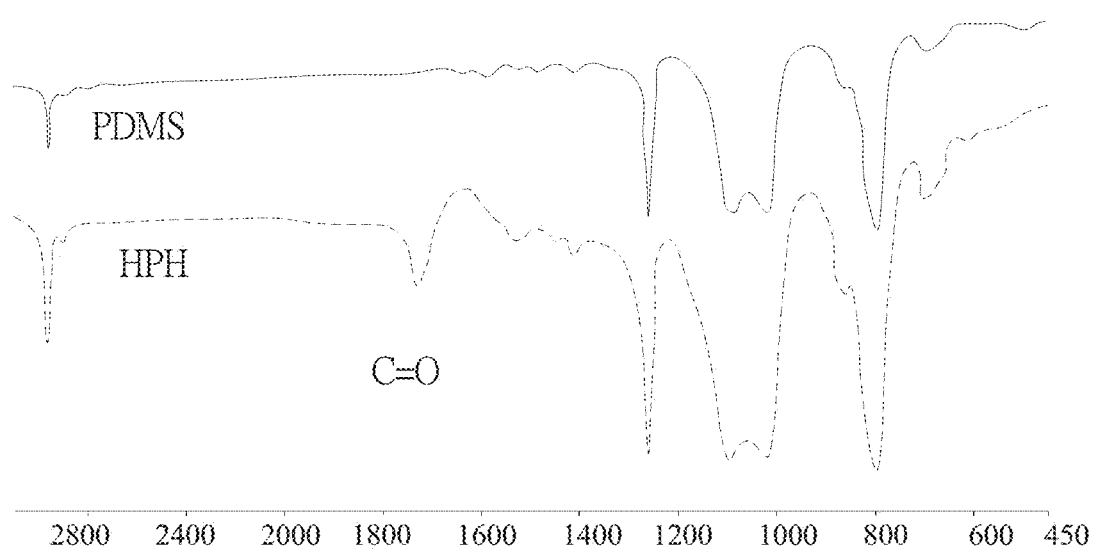
FIG. 4 is a FTIR analytical graph of the amphiphilic macromolecules of the present invention.

Please refer to FIG. 4 which shows the FTIR analytical graph of the amphiphilic macromolecules of the present invention. As shown, a C=O bond is not observed in PDMS. However the existence of the C=O bond is found at 1600-1700 cm$^{-1}$, proving that HEMA is successfully reacted on PDMS.

Subsequently, HEMA-PDMS-HEMA is selected as amphiphilic macromolecules. HEME is selected as the second acrylic acid derivative. Darcour1173 is selected as photocrosslinking agents to manufacture a contact lens. The preparation ratio is as shown in Table 1. The procedure in detail is stated as follows.

TABLE 1

| Samples | HEMA-PDMS-HEMA | HEMA |
|---|---|---|
| 0% HPH | 0 μL | 1000 μL |
| 2% HPH | 20 μL | 980 μL |
| 4% HPH | 40 μL | 960 μL |
| 6% HPH | 60 μL | 940 μL |

The preparation is made according to Table 1. After the preparation, the solution is stirred evenly. One hour later, 1M 5 μL NaOH is added and mixed with the solution quickly. After 30 minutes of waiting, 10 μL Darcour1173 as photocrosslinker is added. The contact lens may be obtained after crosslinking for 20 minutes with the use of 365 nm wavelength ultraviolent rays. Finally, the contact lens is soaked in 95% alcohol for oscillation for 2 hours and in deionized water for oscillation for 2 hours to obtain a contact lens with different prescriptions.

Subsequently, various property analyses are performed on the produced contact lens.

MTS and Tensile Rate Tests:

The contact lens is tested with the use of the microforce testing system (Tyron™ 250). The results are as shown in Table 2, FIG. 5, and FIG. 6.

TABLE 2

| Samples | Young's modulus (MPa) | Tensile rate (%) |
|---|---|---|
| 0% HPH | 0.27 ± 0.09 | 279.3 ± 14.05 |
| 2% HPH | 0.45 ± 0.04 | 259.0 ± 23.64 |
| 4% HPH | 0.60 ± 0.06 | 225.0 ± 28.48 |
| 6% HPH | 0.70 ± 0.06 | 170.3 ± 9.30 |

Figure 5:
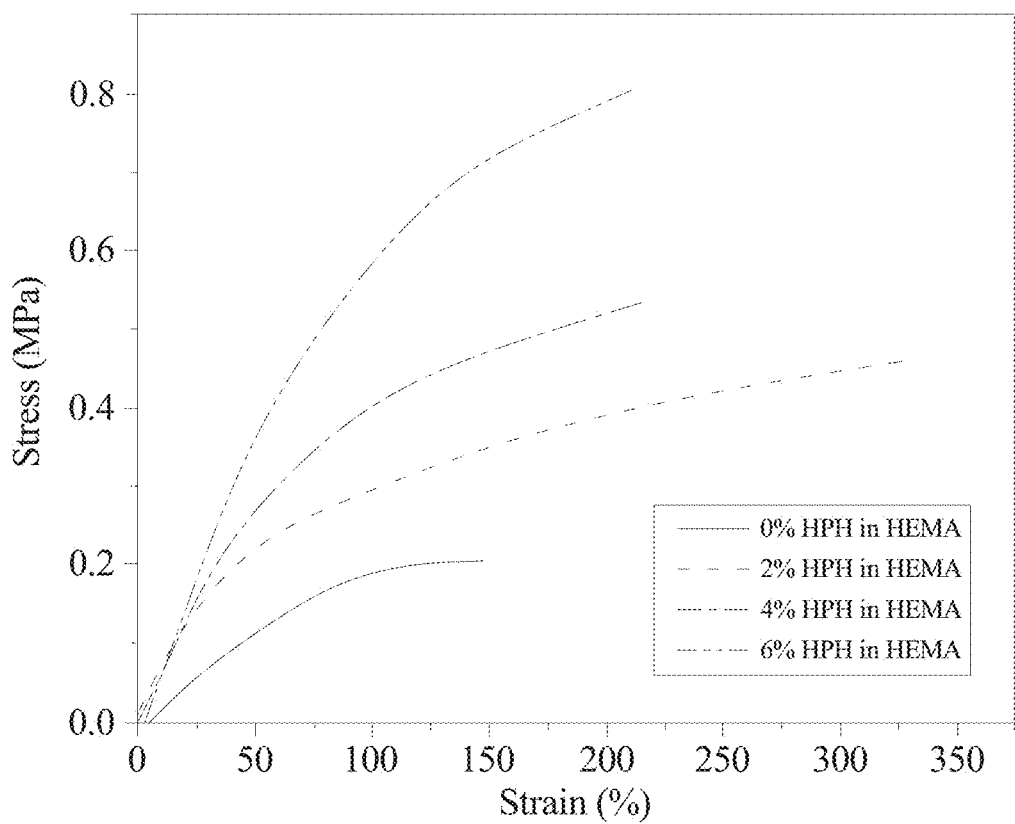
FIG. 5 is an analytical graph of the mechanical property of the contact lens of the present invention.
Figure 6:
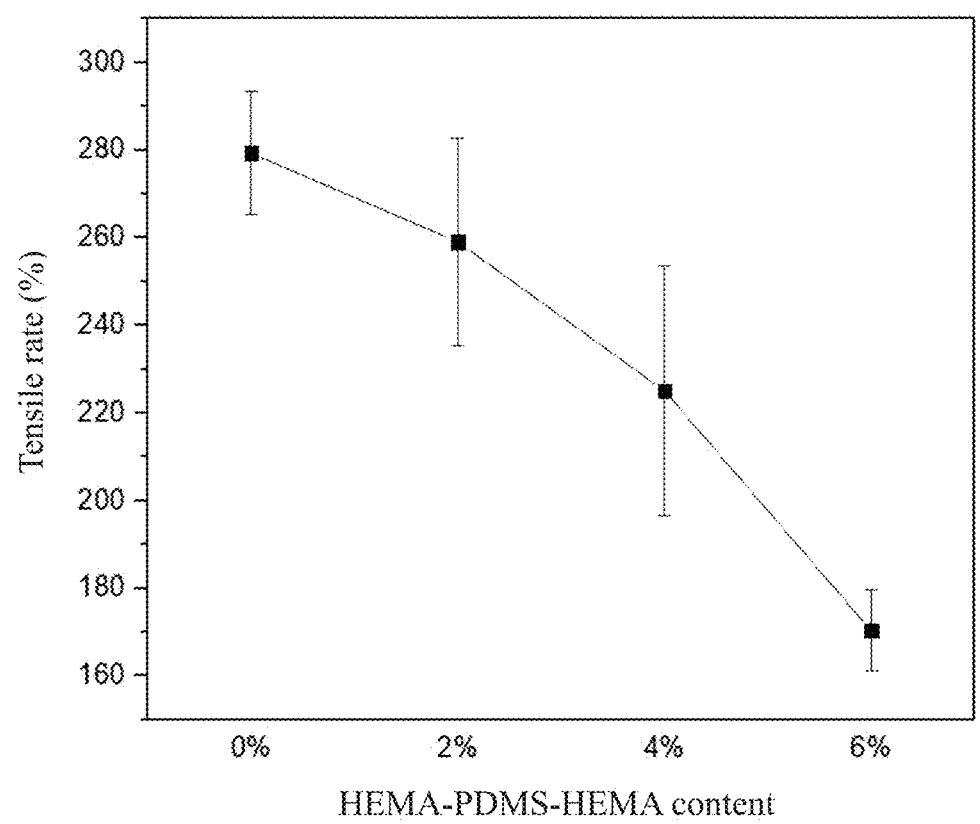
FIG. 6 is an analytical graph of the mechanical property of the contact lens of the present invention.

Please refer to FIG. 5 and FIG. 6 which shows the analytical graph of the mechanical property of the contact lens of the present invention, together with Table 2. It is known that more addition of HEMA-PDMS-HEMA may lead to an increase in Si—O bonds. This may cause an increase of the Young's modulus of the contact lens and a decrease in the tensile rate.

Light Transmittance Test:

The lens is tested at the wavelength of 400-700 nm with the use of a UV-visible spectrometer (Evolution 300, Thermo). The result is shown as in Table 3 and FIG. 7.

TABLE 3

| Samples | Transmittance (%) |
|---|---|
| Lenses on the market Hydrogel type as Ticon | 97.9 |
| Lenses on the market Hydrogel type as Acuvue | 89.5 |
| 2% HPH | 98-99 |
| 4% HPH | 96-99 |
| 6% HPH | 92-98 |

Figure 7:
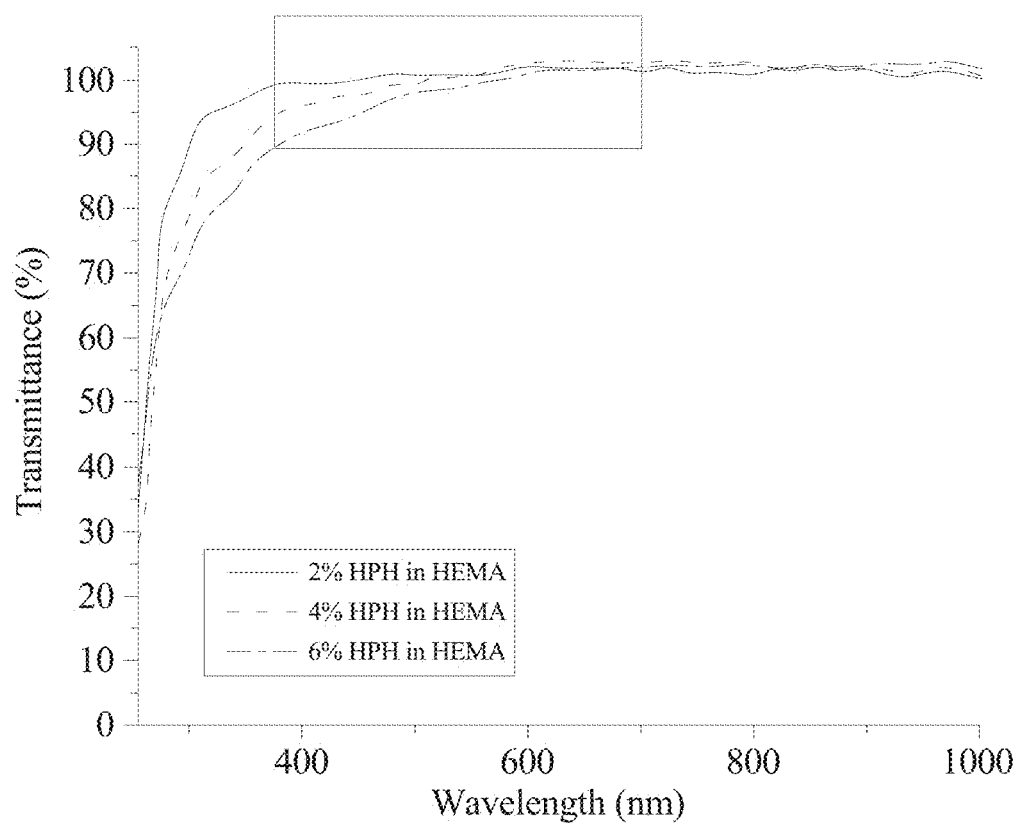
FIG. 7 is an analytical graph of the transmittance of the contact lens of the present invention.

Please refer to FIG. 7 which shows the analytical graph of the transmittance of the contact lens of the present invention, together with Table 3. It is known that the long-chain structure of the Si—O bond in the HEMA-PDMS-HEMA molecules still differs from the HEMA structure. Therefore, some phase separations may possibly occur. This makes the transmittance of the contact lens with more addition of HEMA-PDMS-HEMA decrease. Nevertheless, not many differences are identified compared to contact lenses on the market.

Oxygen Permeability Test:

With the use of an oxygen permeometer, it is known that the oxygen permeability at 0% is about 12 Dk/t. The oxygen permeability at 2% HPH is 24 Dk/t, which is 2 times higher. This shows that increasing HPH content can continuously increase the oxygen permeability.

Water Retention Test:

The contact lens of present invention is dried in an oven and then weighed ($Wd$). When the water absorption of the contact lens reaches saturation, the moisture on the surface is wiped out and the contact lens is weighed ($Ww$). Afterwards, the contact lens is placed in a sealed container and weighed at every time interval ($Wt$). The water retention is calculated by formula (1). The result is shown as in Table 4 and FIG. 8.

$$\text{Water retention}(\%) = (Wt - Wd)/(Ww - Wd) \times 100\% \qquad \text{Formula (1)}$$

TABLE 4

| | Water retention (%) | | | | | |
|---|---|---|---|---|---|---|
| Samples | 0 Hour | 1 Hour | 2 Hours | 4 Hours | 6 Hours | 8 Hours |
| 0% HPH | 100 | 84.1 ± 2.42 | 74.5 ± 4.67 | 67.9 ± 4.87 | 58.5 ± 4.66 | 52.3 ± 3.00 |
| 2% HPH | 100 | 83.2 ± 5.07 | 71.9 ± 2.74 | 60.9 ± 7.65 | 52.0 ± 7.81 | 44.0 ± 3.50 |
| 4% HPH | 100 | 81.6 ± 4.95 | 70.6 ± 9.64 | 59.6 ± 3.64 | 51.3 ± 5.12 | 43.0 ± 7.30 |
| 6% HPH | 100 | 77.4 ± 4.89 | 67.1 ± 2.11 | 56.0 ± 2.25 | 46.1 ± 3.22 | 39.1 ± 2.69 |

Figure 8:
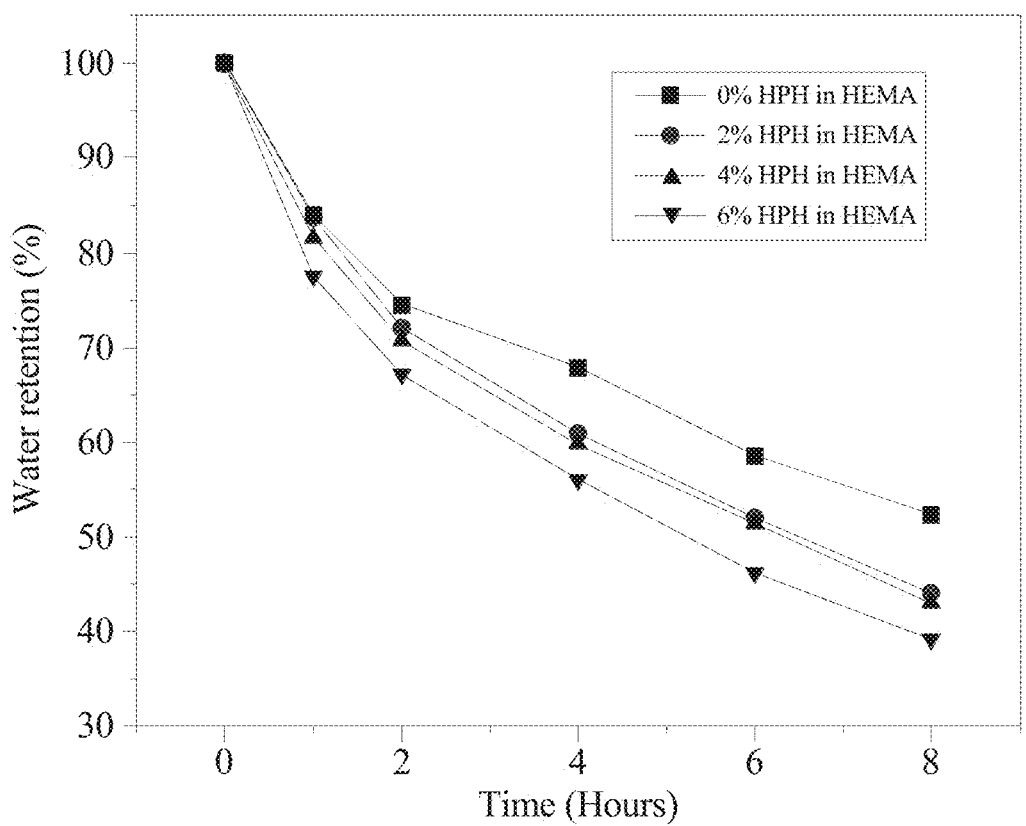
FIG. 8 is an analytical graph of the water retention in the contact lens of the present invention.

Please refer to FIG. 8 which shows the analytic graph of water retention in contact lens of the present invention, together with Table 4. It is known that in the water retention test, the contact lens with more addition of HEMA-PDMS-HEMA molecules may cause a larger amplitude of reduction in water retention. The reason for this phenomenon may be attributed to the fact that the Si—O bond functional group is a hydrophobic group.

Dispersion Test:

Having been moisturized for 1 day, the contact lens is placed at a temperature of −20° C. for 30 minutes. Next, the contact lens is placed in a freezer at a temperature of −80° C. for 30 minutes. Afterwards, the contact lens is placed in a freeze-drying apparatus for 3 days. Then, SEM image capturing is performed on the appearance of the obtained sample through using a field emission scanning electron microscope (FE-SEM, JAM-6700F). The distribution of Si elements is analyzed by EDS. The result is shown as in FIG. 9.

Figure 9:
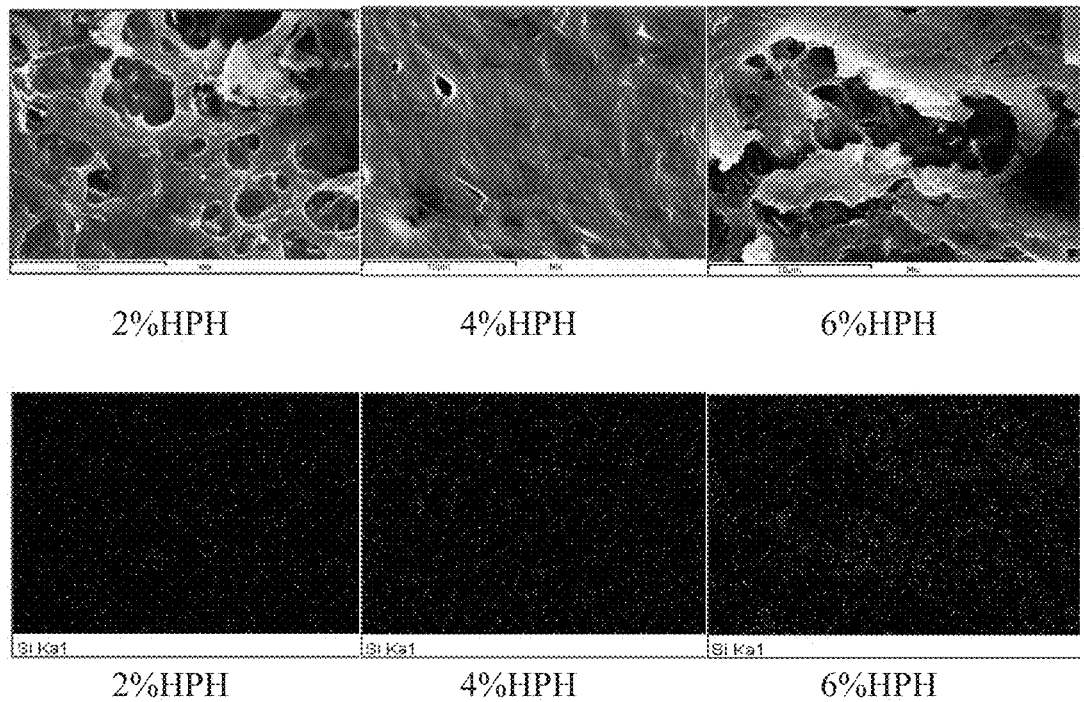
FIG. 9 is a SEM analytical graph of the contact lens of the present invention.

FIG. 9 is a SEM image of the contact lens of the present invention combined with EDS analysis, wherein the red dots shows the results of the positions marked by the detected Si elements through using an EDS laboratorial apparatus. That is, when the red dots are dense, it is indicated that HEMA-PDMS-HEMA is dense, wherein the density is the highest at 6%. From this point, it is known that when HEMA-PDMS-HEMA content is high, the microstructure shows a denser configuration with the reduction of open porosity and a decrease in oxygen permeability. Meanwhile, for the red dots distribution as shown in FIG. 9, it is found that the Si in HEMA-PDMS-HEMA in contact lens have excellent distribution.

Transmittance Test:

The contact lens is soaked in PBS overnight to ensure complete inflation and moisture. Then, the contact lens with complete inflation and moisture (in a hydrogel state) is placed on the holder. The holder is placed under a UV-vis spectrometer (Thermo Scientific, Evolution 300). The transmittance of contact lens is tested at the wavelength of 300-1000 nm. The result is shown as in FIG. 10.

Figure 10:
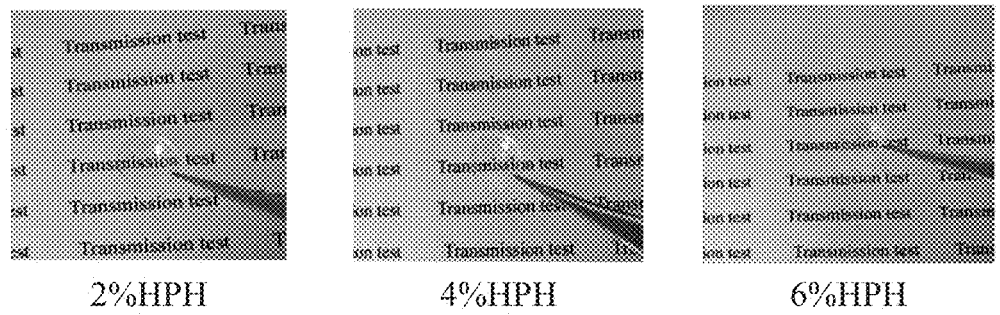
FIG. 10 is an analytical graph of the degree of transmittance of the contact lens of the present invention.

Please refer to FIG. 10 which shows the analytical graph of the transmittance of the contact lens of the present invention. It is known that contact lenses with different amounts of HEMA-PDMS-HEMA content all have fine transmittance.

In sum, the amphiphilic macromolecules, the contact lens and the manufacturing methods thereof of the present invention may be capable of solving the problem of poor immiscibility between hydrophilic monomers and siloxane molecules in contact lens, thus reducing phase changes in contact lens. This allows the present invention to further provide a contact lens with excellent oxygen permeability, Young's modulus, and transmittance. Furthermore, the amphiphilic macromolecules of the present invention may not only be applied to contact lenses, but also be widely applied in biomedical materials having immiscibility problems.

The above description is merely illustrative rather than restrictive. Any equivalent modification or alteration without departing from the spirit and scope of the present invention should be included in the appended claims.

What is claimed is:

1. A manufacturing method of amphiphilic macromolecules, comprising:
    reacting a first acrylic acid derivative with N,N'-carbonyldiimidazole to obtain a modified acrylic acid derivative; and
    reacting the modified acrylic acid derivative with a siloxane derivative to obtain amphiphilic macromolecules;
    wherein a terminal of the first acrylic acid derivative has a hydroxyl group;
    wherein the siloxane derivative is a hydroxyl-terminated, acrylamide-terminated, epoxy-terminated, or amine-terminated polysiloxane molecule.

2. The manufacturing method according to claim 1, wherein the first acrylic acid derivative is hydroxyethyl methacrylate or hydroxymethyl methacrylate.

3. The manufacturing method according to claim 1, wherein the polysiloxane molecule is polydimethoxysiloxane.

4. The manufacturing method according to claim 1, wherein a structure of the siloxane derivative is as shown in structural formula 1:

Structural formula 1

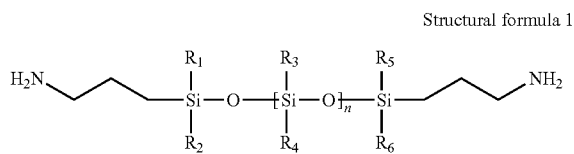

Wherein,
    $R_1$ to $R_6$ are each independently selected from H, substituted or unsubstituted $C_1$-$C_{30}$ alkyl group, substituted or unsubstituted $C_1$-$C_{30}$ heteroalkyl group, substituted or unsubstituted $C_3$-$C_{30}$ cycloalkyl group, substituted or unsubstituted $C_2$-$C_{30}$ heterocycloalkyl group, substituted or unsubstituted $C_2$-$C_{30}$ alkenyl group, substituted or unsubstituted of $C_3$-$C_{30}$ cycloalkenyl group, substituted or unsubstituted $C_2$-$C_{30}$ heterocycloalkenyl group, substituted or unsubstituted $C_6$-$C_{60}$ aryl group, and substituted or unsubstituted $C_1$-$C_{60}$ heteroaryl group; and
    n is an integer ranging from 500-2500.

5. Amphiphilic macromolecules prepared by the manufacturing method according to claim 1.

6. A manufacturing method of a contact lens, comprising:
    mixing the amphiphilic macromolecules according to claim 5 with a second acrylic acid derivative, wherein the first acrylic acid derivative and the second acrylic acid derivative are identical or different; and
    adding photocrosslinking agents and giving illumination to react the amphiphilic macromolecules with the second acrylic acid derivative for crosslinking, thus obtaining a contact lens.

7. A contact lens obtained by the manufacturing method according to claim 6.

8. The contact lens according to claim 7, wherein the amphiphilic macromolecules account for 0.5 wt %-10 wt % of a weight of the contact lens.

9. The contact lens according to claim 7, wherein Young's modulus of the contact lens is a value from 0.2 to 1 MPa.

* * * * *